United States Patent [19]
Sarro

[11] Patent Number: 5,036,959
[45] Date of Patent: Aug. 6, 1991

[54] WHEELCHAIR WITH A BRAKING ASSEMBLY

[76] Inventor: Joanne Sarro, 52 Lynn Way, Revere, Mass. 02151

[21] Appl. No.: 541,507

[22] Filed: Jun. 21, 1990

[51] Int. Cl.5 .............................................. B62B 11/00
[52] U.S. Cl. ...................................... 188/2 F; 188/29; 280/650; 297/DIG. 4
[58] Field of Search ...................... 188/2 F, 19, 20, 29; 280/647, 650; 297/DIG. 4

[56] References Cited

U.S. PATENT DOCUMENTS

| | | | |
|---|---|---|---|
| 2,713,891 | 7/1955 | Linquist | 297/DIG. 4 X |
| 3,529,700 | 9/1970 | Marshall | 188/29 |
| 4,852,697 | 8/1989 | Kulik | 188/2 F |
| 4,917,395 | 4/1990 | Gabriele | 280/647 X |

*Primary Examiner*—Robert J. Oberleitner
*Assistant Examiner*—Alfred Muratori
*Attorney, Agent, or Firm*—Terry M. Gernstein

[57] ABSTRACT

A braking assembly is mounted on a wheelchair so it can be operated by an attendant. The braking assembly includes friction pads that are engaged with both wheels of the chair by operating a lever mechanism. The chair also includes an occupant-actuated assembly which operates the lever mechanism to slow the chair down; and then, after the friction pads have engaged the wheels with a predetermined pressure, will engage an element against one of the wheels to stop rotation of that wheel. The occupant-actuated assembly can be foot operated or hand operated.

7 Claims, 6 Drawing Sheets

WHEELCHAIR WITH A BRAKING ASSEMBLY

TECHNICAL FIELD OF THE INVENTION

The present invention relates to the general art of wheelchairs, and to the particular field of wheelchair brake assemblies.

BACKGROUND OF THE INVENTION

Most wheelchairs are equipped with a brake assembly of some sort. Such brake assemblies are usually hand operated by the wheelchair occupant.

While effective, these brake assemblies have several drawbacks. For example, if the wheelchair is being pushed by an attendant, the attendant may want total control of the chair, including the braking thereof. Many occupant-controlled wheelchair braking assemblies vitiate such attendant control.

Still further, since most wheelchair brake assemblies engage only one wheel of the chair, the effectiveness thereof can be reduced, especially on a steep incline where heavy braking may be needed. If a brake assembly engages only one wheel, the chair movement may be unbalanced.

It should also be noted that, even though it is often desireable for a wheelchair braking assembly to be under the control of an attendant, there may be situations where the wheelchair occupant must control the brake. This is especially the case if the chair, somehow, becomes free of the attendant and moves down a long or steep incline. This situation might be viewed as a run away condition. Such run away condition may require emergency braking by the occupant of the chair. However, such emergency braking should not cause the chair to become unstable, which might occur if only one wheel is braked, or if the brake is applied too quickly. Thus, the occupant should have the option of rapidly and stably slowing down a run away chair and then stopping such slowed chair completely in a safe and rapid manner. Many presently available wheelchairs do not provide the option of first slowing down a run away chair and then stopping it completely once it is under control.

Therefore, there is a need for a wheelchair brake assembly which can be controlled by an attendant, yet which can also be controlled by a wheelchair occupant in the event of a wheelchair run away condition to quickly and stably slow the chair to a desired speed and then to bring the slowed chair to a complete stop in a secure and stable manner that will prevent the chair from continuing to move until it is desirable to continue chair movement.

OBJECTS OF THE INVENTION

It is a main object of the present invention is to provide a wheelchair brake assembly which can be controlled by an attendant.

It is another object of the present invention to provide a wheelchair brake assembly which can be controlled by an attendant, yet which can also be controlled by a wheelchair occupant in the e vent of a wheelchair run away condition to quickly and stably slow the chair to a desired speed.

It is another object of the present invention to provide a wheelchair brake assembly which can be controlled by an attendant, yet which can also be controlled by a wheelchair occupant in the event of a wheelchair run away condition to quickly and stably slow the chair to a desired speed and then to bring the slowed chair to a complete stop in a secure and stable manner that will prevent the chair from continuing to move until it is desirable to continue chair movement.

SUMMARY OF THE INVENTION

These, and other, objects are achieved by a wheelchair which includes a brake assembly that can be operated by an attendant, or by the occupant. In an occupant operated situation, the brake assembly slows the chair down using the attendant-operated portion of the assembly and then, if necessary, stops rotation of one of the wheels. However, the stopping of the wheel rotation only occurs after the attendant-operated brake portion has been actuated to slow the chair to a desired speed.

The attendant-operated portion of the brake assembly includes a friction pad that is pressed against each wheel of the chair by operation of a U-shaped frame attached to the chair.

The occupant-controlled portion of the brake assembly includes both a foot pedal and a hand lever that are connected to the attendant-operated portion of the assembly to move the friction pads against the wheels. The occupant-controlled portion also includes elements that prevent rotation of one of the wheels. However, this portion of the brake assembly is not actuated until after the friction pads have been pressed against the wheels. In this manner, the occupant can control the movement of the chair using the friction pads; however, if this is not sufficient, there is an emergency brake available that jams one of the wheels. Such emergency brake need not be used, but if needed can be used in a manner that is as safe as possible since the forward motion of the chair will have been checked and slowed prior to actuation of this emergency brake. This substantially reduces the risk that the actuation of the emergency brake will tip the chair.

BRIEF DESCRIPTION OF THE DRAWING FIGURES

DETAILED DESCRIPTION OF THE PREFERRED EMBODIMENT OF THE INVENTION

Figure 1:
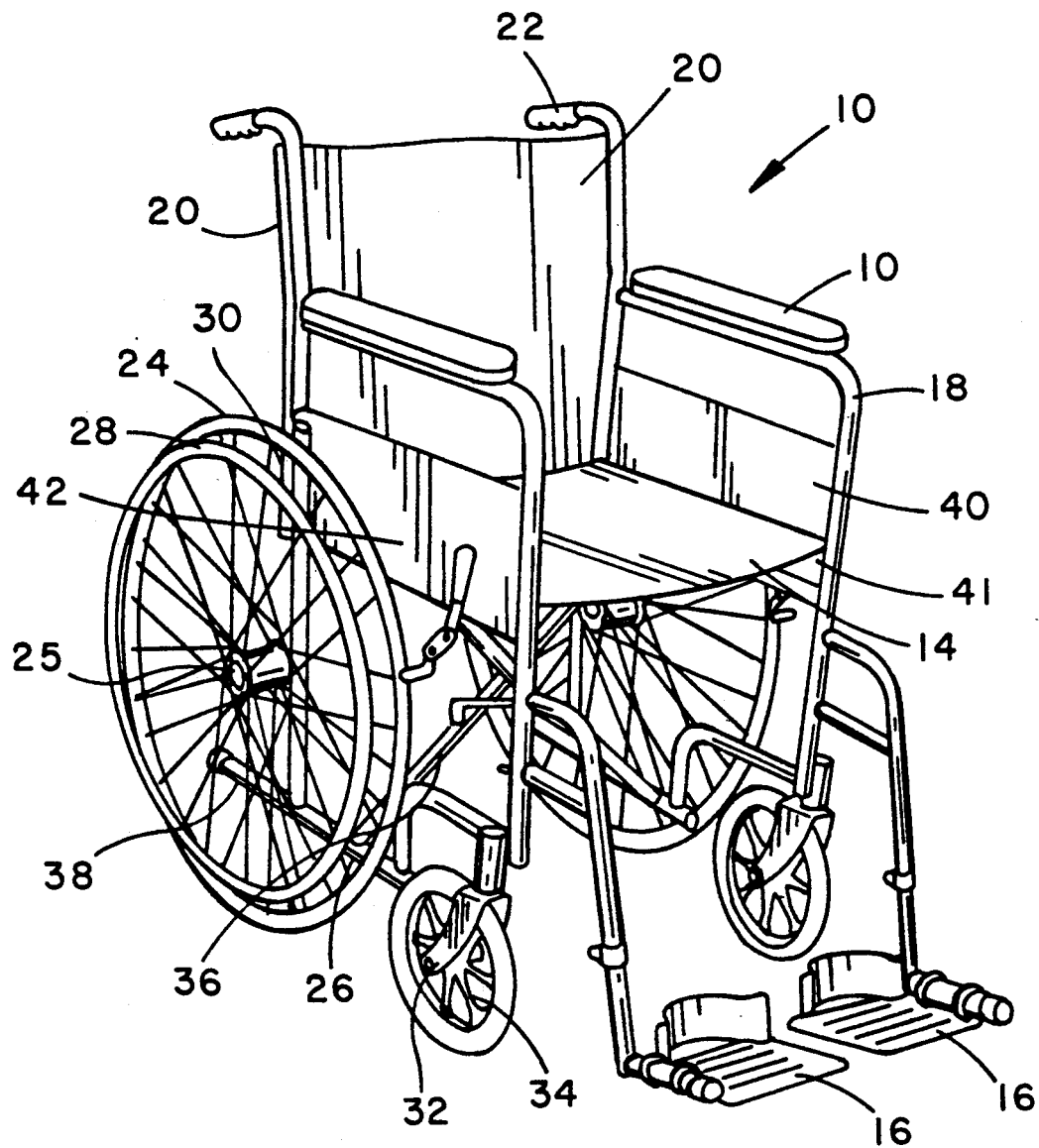
FIG. 1 is a front perspective view of a generally available wheelchair.

Shown in FIG. 1 is a commonly available wheelchair 10. The wheelchair 10 includes a frame assembly 12 which supports a seat 14 between two side sections. The frame assembly further includes foot rests 16 attached to arm rests 18 which, in turn, are attached to upstanding frame elements 20 each having a handle 22 on end and a large wheel 24 rotatably mounted thereon at another end thereof by a hub 25. The wheel 24 has an inner surface 26 and a push rim 28 thereon and includes spokes 30. A caster 32 is rotatably mounted on the arm rest element by an axle bolt 34, and a crossbrace 36 is also included as is a tipping lever 38. A clothing guard 40 and seat upholstery 41 are also generally included.

The wheelchair 10 also generally includes an occupant-operated wheel lock 42. As was discussed above, such occupant-operated brake may not always be acceptable in all situations, and some situations require an attendant-controlled brake assembly. Accordingly, the wheelchair of the present invention includes a brake system that can be operated by an attendant.

Figure 2:
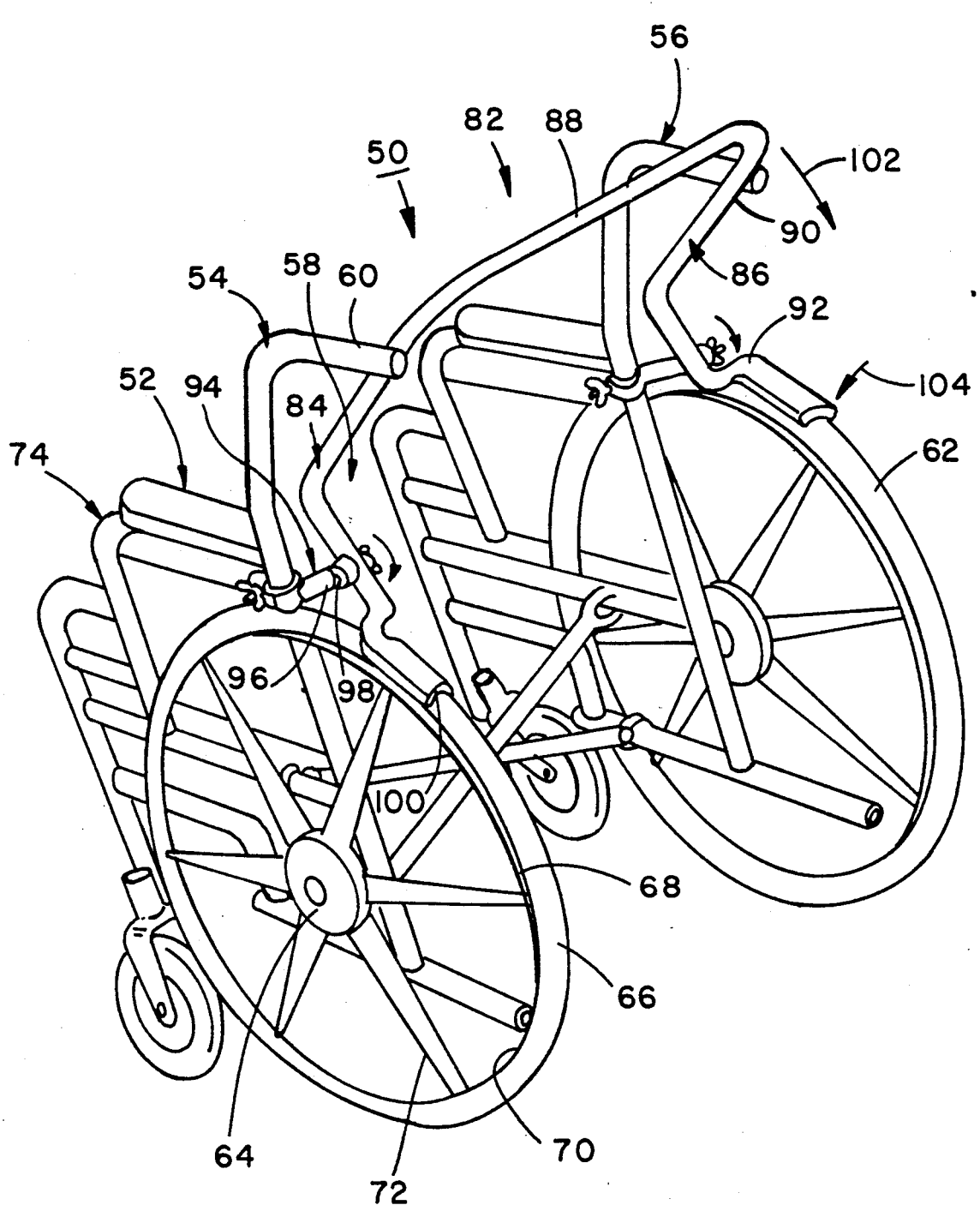
FIG. 2 is a rear perspective view of a wheel chair having an attendant-controlled brake assembly thereon.
Figure 3:
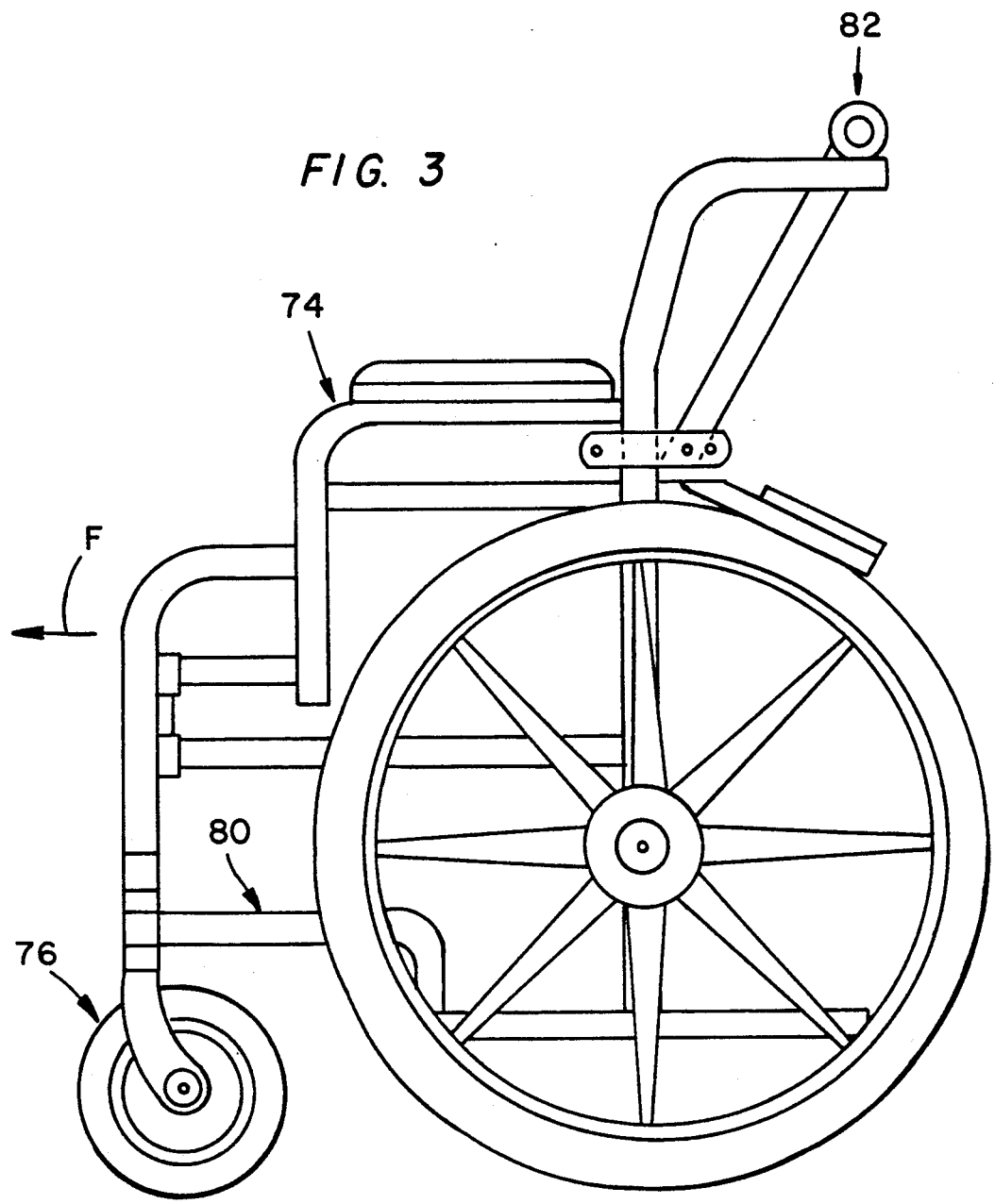
FIG. 3 is a side elevational view of the FIG. 2 wheelchair.

A first form of the present invention is embodied in a wheelchair 50 which is best shown in FIGS. 2 and 3, to which attention is now directed.

The wheelchair 50 includes a frame assembly 52 which includes two spaced-apart upstanding frame elements 54 and 56 which are located on either side of a seat section 58 in which an occupant sits. The attendant pushes the chair using handles, such as handle 60, on an aft end of each frame element, and the bottom end of each frame element rotatably supports the chair wheels, such as wheel 62 by means of a hub, such as hub 64 and axle combination in the usual manner. Each wheel has a tire 66 on a rim 68 thereof, with the rim having an inner surface 70 to which spokes, such as spoke 72, are attached.

The frame assembly also includes arm elements, such as arm element 74, that are attached at an aft end thereof to the upstanding elements and which have a caster unit 76 on the other end thereof. A support rod 80 is attached at a forward end thereof to each arm element superadjacent to the caster on that arm element, and extends rearwardly of the chair adjacent to each wheel. It is noted that terms such as "forward", "aft" and the like are relative to the forward movement of the chair, which is indicated in FIG. 3 by arrow F. The clothing guards, and seat element are not shown in FIG. 3 for the sake of clarity.

The wheelchair 50 includes an attendant-operated brake assembly 82 which has an overall U-shape that is formed by two spaced-apart L-shaped levers 84 and 86 which are connected together by a connecting element 88. Each L-shaped lever includes a long leg 90 and a short leg 92, with the long legs being connected together by the connecting element 88 spanning transversely across the rear of the wheelchair between the handles. Each L-shaped lever is pivotally connected to an upright element by a clamp element, such as clamp element 94. Each clamp element includes two halves that are located on diametric opposite sides of an upright element and held together by fastener elements, such as screws or the like. A pivot arm 96 extends upwardly and rearwardly from each upright element, and is pivotally attached to a short leg of an L-shaped lever by a pivot pin 98. A second form of the clamp is shown in FIG. 3 as including clamshell-like halves 99.

Each L-shaped lever short leg has a friction pad 100 mounted thereon to be located closely adjacent to the outer surface of the tire associated therewith. The brake assembly 82 is operated by an attendant by forcing the connecting element downwardly in the direction indicated in FIG. 2 by arrow 102. Such movement forces the friction pads downwardly in direction 104 against the tires. The frictional engagement between the friction pads and the tires slows rotation of the tires and will bring the chair to a stop. Operation on both tires will create a controlled stopping that is not likely to cause the chair to drift to one side or the other. Engaging both tires with friction pads also creates a stopping force that is greater than if only one tire were engaged.

Figure 4:
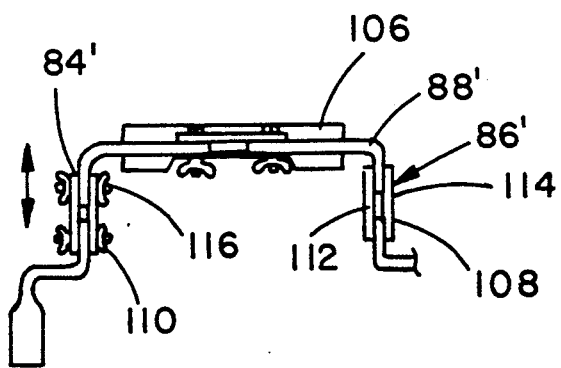
FIG. 4 illustrates an adjustable portion of the attendant-actuated brake assembly.

As shown in FIG. 4, the brake assembly 82 can include adjustable elements, such as vertically adjustable L-shaped levers 84' and 86', and horizontally adjustable connecting element 88'. A cover 106 can be used on the connecting element, and a cover 108 can be used on each of the L-shaped levers. The adjustment of each of these elements is accomplished by means of a clamping element, such as clamping element 110 that has two clamshell-type halves 112 and 114 which have fastener-receiving holes defined in each end thereof. The brake assembly elements have fastener-receiving holes defined therethrough and fasteners, such as wing nut 116, are inserted through the holes when the desired spacing between adjacent portions of the brake assembly elements is achieved.

Figure 5:
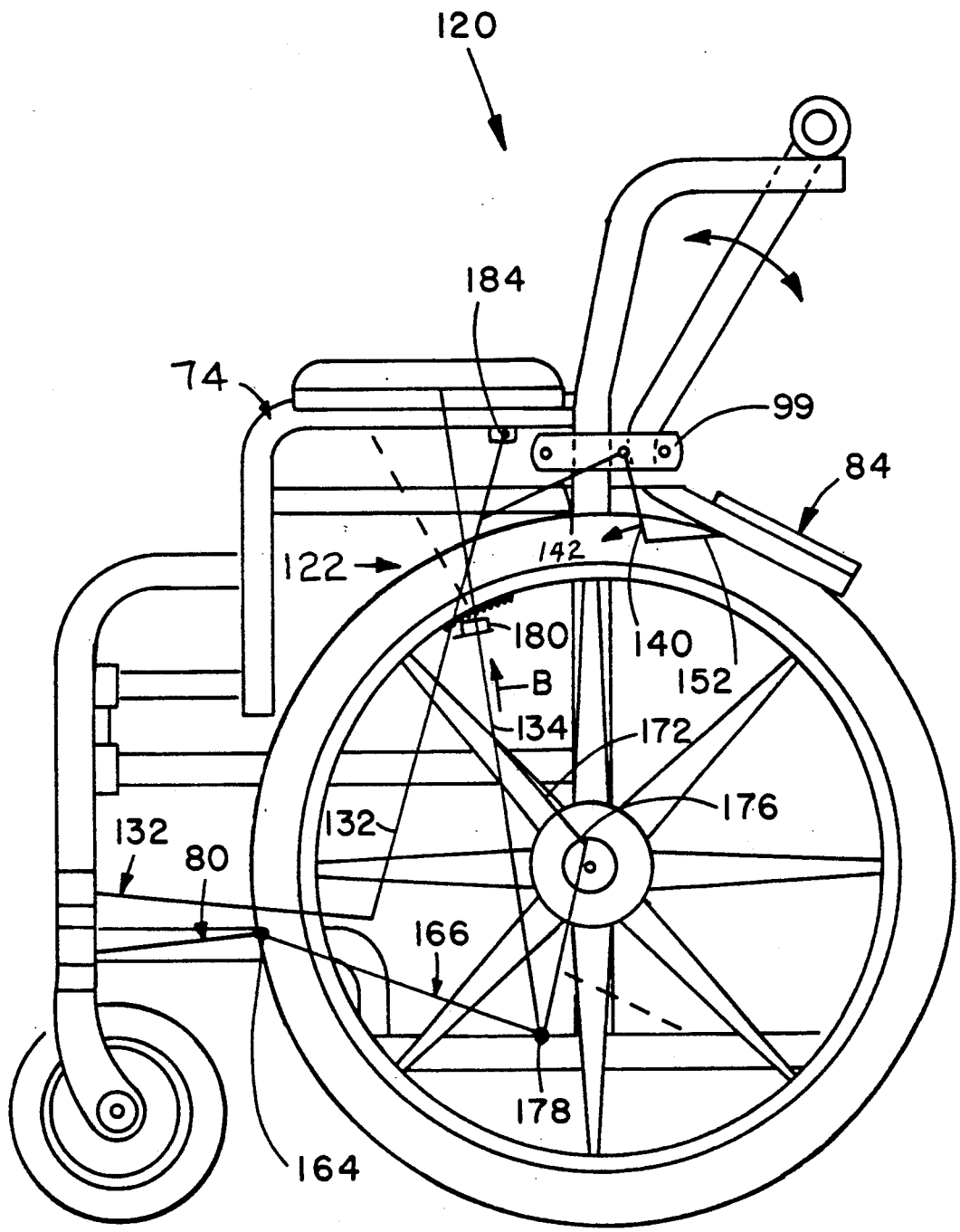
FIG. 5 is a side elevational view of a wheelchair having both an attendant-controlled brake assembly and an occupant-controlled brake assembly which includes only a foot-operated pedal.

As discussed above, there are some situations, such as a run away chair condition, in which the occupant of the chair should have the capability to slow and stop the chair. Accordingly, as shown in FIG. 5, a wheelchair 120 forms a second embodiment of the wheelchair and includes an emergency brake-actuating assembly 122. The emergency brake-actuating assembly has means for the occupant to actuate the attendant-operated brake assembly discussed above to slow the chair, and then to bring it to a complete stop after it has slowed sufficiently so the chair can be stopped without tipping. The emergency brake-actuating assembly includes elements which permit it to be operated by foot or by hand so a chair occupant who cannot move his feet can still bring the chair under control and to a complete stop, or vice versa for an occupant who can use at least one of his feet. It is important to observe that the emergency brake-actuating assembly utilizes the attendant-operated brake assembly, and does so in a manner that first slows the movement of the chair before actuating any elements which will bring the chair to an abrupt stop. Thus, the attendant-operated braking assembly is actuated in a two step procedure, to first slow the chair and then, only after the occupant feels the chair is under control, stops the chair completely.

Figure 6:
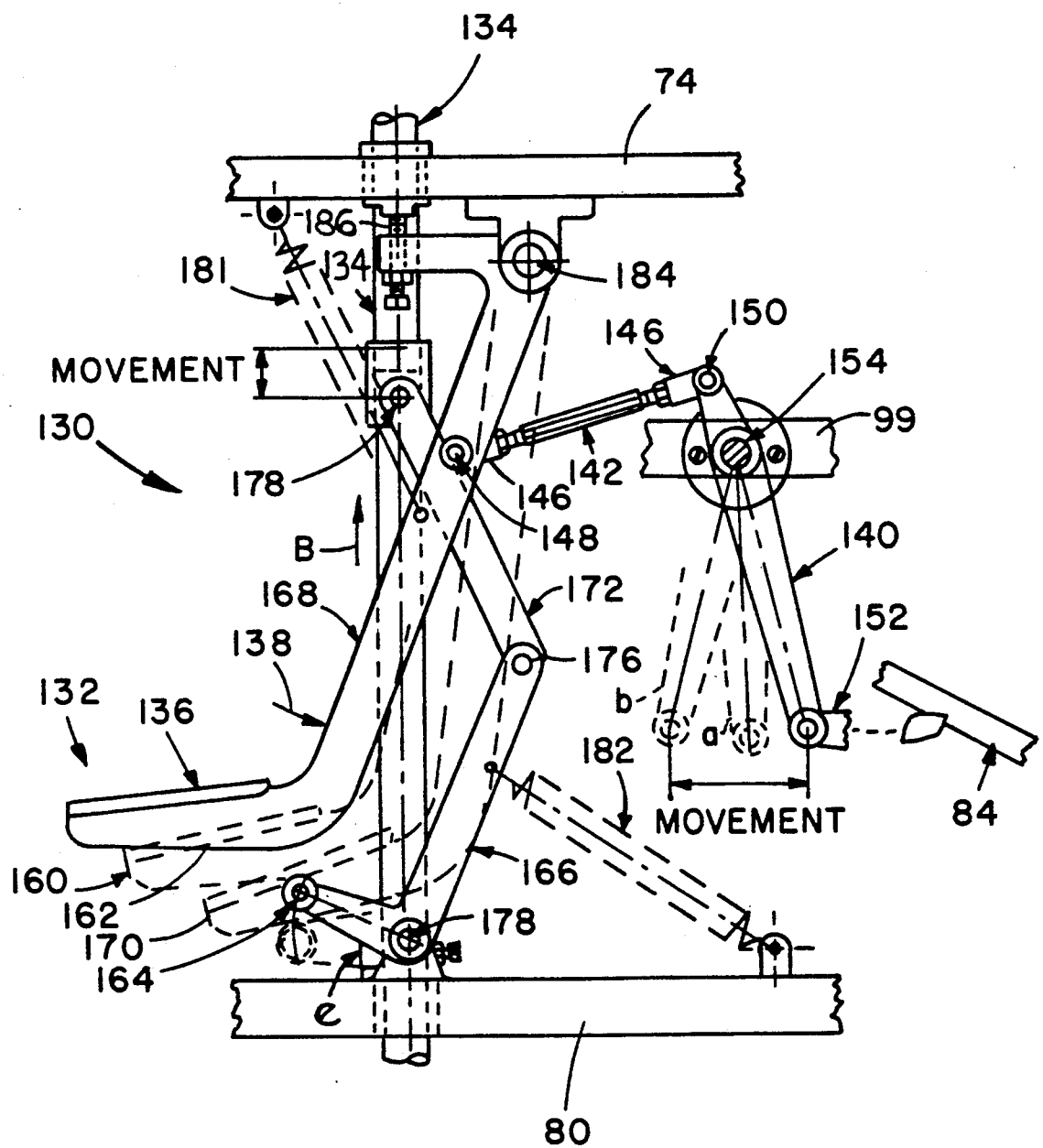
FIG. 6 illustrates the occupant-operated brake assembly.

The mechanism used to accomplish this is best shown in FIG. 6, and attention is directed thereto. The mechanism 130 is mounted on one side of the chair and utilizes the movement of the occupant's leg as it swings a pedal 132 to transmit rotary motion to the attendant-operated assembly, and, then to impart movement to an emergency brake element 134. The rotary motion occurs during the first part of the swinging movement, and the movement of the emergency element, indicated by arrow B, occurs during a last portion of the foot movement. If the foot movement is stopped, the emergency element will not be moved. Thus, if the occupant can bring the chair under control without using the emergency element, he can do so; however, the emergency element will be available if necessary.

As shown in FIG. 6, the occupant, with his foot on the lever at 136, kicks it back in the direction indicated by arrow 138. At the beginning of the stroke, lever 140 is caused to move through the medium of connecting rod 142 attached by adjustable rod ends 146 to studs 148 and 150. This movement is transmitted by connecting link 152 to lever arm 84. Lever 140 rocks on shaft 154, which is supported in bearings in the clamping element 99.

When pressure of the foot at 136 has moved the lever to the position indicated by the dotted lines at 160, lever 140 will have been rotated to the position indicated by the dotted lines at a, and surface 162 will be in contact with a roll at 164 on bellcrank 166. The remainder of the foot lever action, which carries lever 168 to position 170, moves lever 140 to position b to further tighten the press fit of the friction pad against the chair wheel, and is utilized in actuating the toggle lever of which crank 166 and link 172 form a part. A vertical movement is imparted to shaft 134 through toggle connecting link stud 176 traveling along path y.

Bellcrank 166 pivots on and is supported by a fixed stud 178. Link 132 is pivotally attached at 178 to a block 180 pinned to shaft 134. The effect of this toggle linkage and rotary lever action is to combine a crosswise movement of connecting link 152 with a delayed vertical movement of shaft 134 when the foot lever is given a full swinging movement from the position shown by full lines to that shown at 176. A spring 181 serves to return the foot lever to its starting point. Another spring 182 returns bellcrank 166 and shaft 134 to their starting points which are determined by collar e. The foot lever 168 pivots on stud 184 mounted on element 74, and a stop screw 186 locates the foot lever in its starting position.

Figure 7:
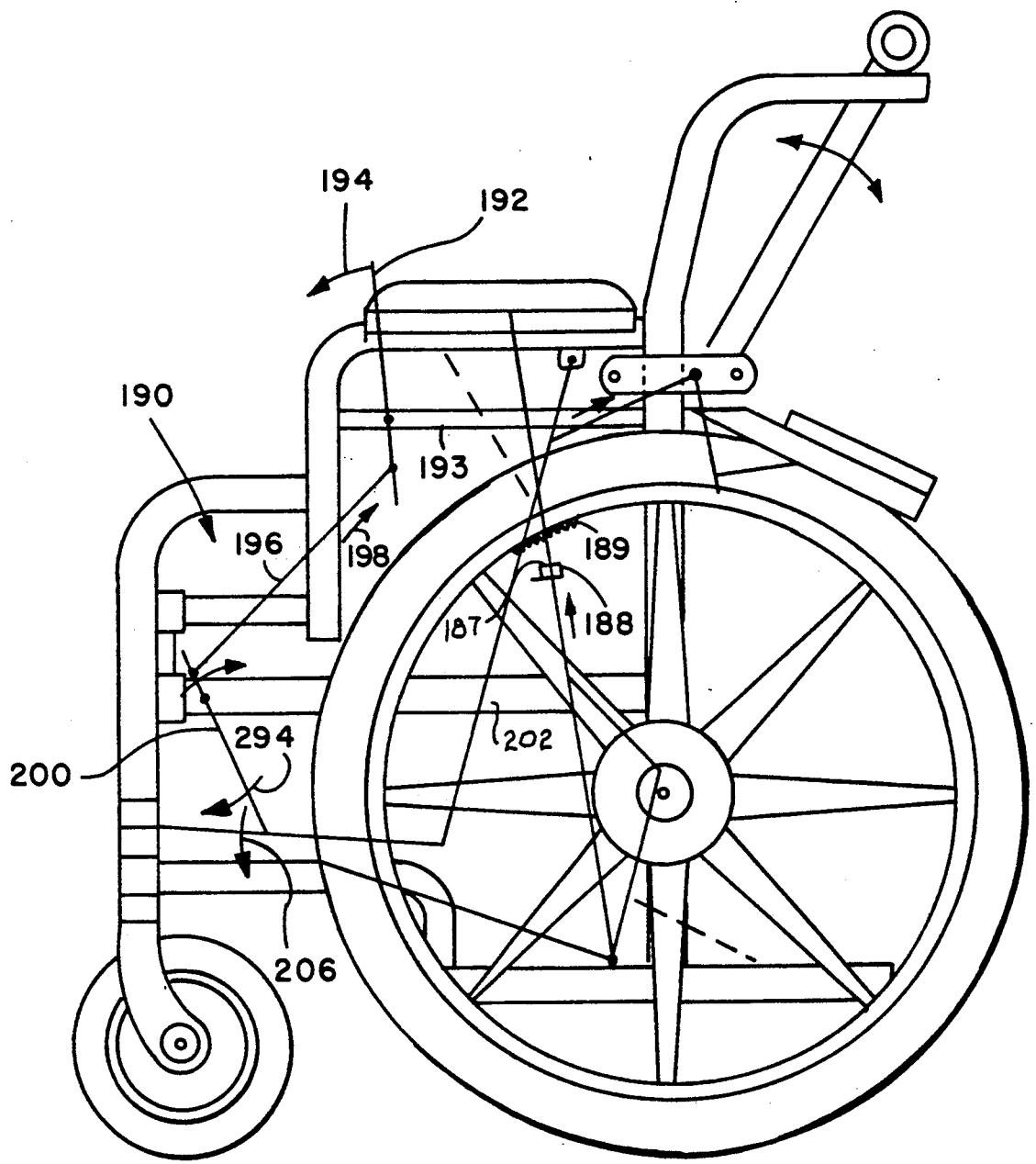
FIG. 7 is a side elevational view of a wheelchair having both an attendant-controlled brake assembly and an occupant-controlled brake assembly which includes both a foot-operated pedal and a hand-operated lever.

As shown in FIG. 7, an element 187 is fixedly mounted on the element 134 to move with that element upwardly when that element is moved by the crank mechanism in the manner just described. This element 187 includes knurling 188 on a top surface and is located to engage the inner surface 70 of the tire when the element 134 has moved a preset distance. The inner surface of the wheel rim also has knurling 189 thereon. When the element 134 has moved the preset distance, the knurling 188 engages the knurling 189 and stops rotation of the wheel.

As discussed above, a wheelchair occupant may not have full use of his legs. Therefore, an additional assembly is included so the just-described foot operated assembly can be operated by hand. Such additional assembly is indicated in FIG. 7 at 190.

The assembly 190 includes a hand crank 192 which is pivotally mounted on a brace member 193 of the frame assembly to be adjacent to the arm element where it can be reached by a wheel chair occupant and which is moved forwardly as indicated by arrow 194 to actuate the braking assembly. The hand crank 194 is connected at a lower end thereof to one end of a connecting link arm 196, with the link arm 196 moving in direction 198 when the hand crank is operated. The other end of the link arm 196 is connected to a top end of a connecting lever arm 200 which is pivotally connected to a brace 202 of the frame assembly to move in direction 204 when the hand crank is operated. The movement of the connecting lever arm 200 in direction 204 forces the foot pedal 136 downwardly. The movement of the foot pedal is indicated by arrow 206 and is exactly the same as above described in reference to FIG. 6.

It is understood that while certain forms of the present invention have been illustrated and described herein, it is not to be limited to the specific forms or arrangements of parts described and shown.

I claim:
1. A wheelchair comprising:

A) a frame assembly including
(1) two spaced-apart upstanding frame elements located on either side of a seat element and each having a handle on one end thereof and a wheel affixed thereto at another end thereof,
(2) an arm rest element attached at one end thereof to each upstanding frame element and at another end thereof to a caster, and
(3) a support rod adjacent to each wheel and mounted on an arm rest element and on an upstanding frame element; and B) a brake assembly for slowing and stopping movement of said wheels including
(1) a wheel-engaging mechanism which includes
(a) a clamping element on each upstanding frame element,
(b) an L-shaped lever pivotally mounted on each clamping element and having a short leg located closely adjacent to the wheel fixed to said each upstanding frame element, and a long leg extending past the handle on said each upstanding frame element,
(c) a friction pad on each L-shaped lever short leg, and
(d) a connecting element connecting said L-shaped lever long legs together, and
(2) an emergency brake-actuating assembly which includes
(a) a foot-operable lever pivotally mounted at one end thereof to one arm rest and connected to one L-shaped lever long leg to force the friction pad on said one L-shaped lever against an associated wheel when operated,
(b) a wheel-engaging element connected to said foot-operable lever to engage a wheel after the friction pad on said one L-shaped lever has already engaged the associated wheel.

2. The wheelchair defined in claim 1 wherein said emergency brake-actuating assembly further includes
(a) a connecting link fixed at one end thereof to the short leg of said one L-shaped lever,
(b) a first lever pivotally mounted on one clamping element and connected at one end thereof to said connecting link,
(c) a connecting rod fixed at one end thereof to another end of said first lever and at another end thereof to said foot-operable lever,
(d) a bellcrank pivotally mounted on one frame assembly support rod and including
(1) a roll element on one end of said bell crank and located adjacent to and spaced from said foot-operable lever to be contacted by said foot-operable lever after said foot-operable lever has moved a pre-set distance, and
(2) a brake assembly link connected at one end thereof to another end of said bellcrank,
(e) a brake assembly shaft movably mounted on the one arm rest and located closely adjacent to the one wheel,
(f) bearing elements in the one arm rest and in the one frame assembly support rod mounting said shaft to said frame assembly to move in a vertical direction,
(g) a fastening element connecting another end of said brake assembly link to said brake assembly shaft,
(h) a first spring element connected at one end thereof to said bellcrank and at another end thereof to the frame assembly one support rod, and (i) a second spring element connected at one end thereof to said foot-operable lever and at another end thereof to the one arm rest.

3. The wheelchair defined in claim 2 wherein said brake assembly further includes a first friction producing means on the one wheel and a second friction producing means on said brake assembly shaft.

4. The wheelchair defined in claim 3 wherein said brake assembly further includes a hand-operable mechanism connected to said foot-operable lever.

5. The wheelchair defined in claim 4 wherein said hand-operable mechanism includes a hand-operable lever pivotally mounted on said frame assembly adjacent to the one arm rest, a first link attached at one end thereof to said hand-operable lever, a second link connected at one end thereof to another end of said first link, a lever arm pivotally mounted on said frame assembly and connected at one end thereof to another end of said second link and connected at another end thereof to said foot-operable lever.

6. The wheelchair defined in claim 5 wherein said wheel-engaging mechanism connecting element includes two movably connected sections.

7. The wheelchair defined in claim 6 wherein each L-shaped lever long leg of said wheel-engaging mechanism includes two movably connected elements.

* * * * *